June 2, 1925.  1,540,146
L. SIMA
REAR AXLE
Filed Feb. 11, 1924.
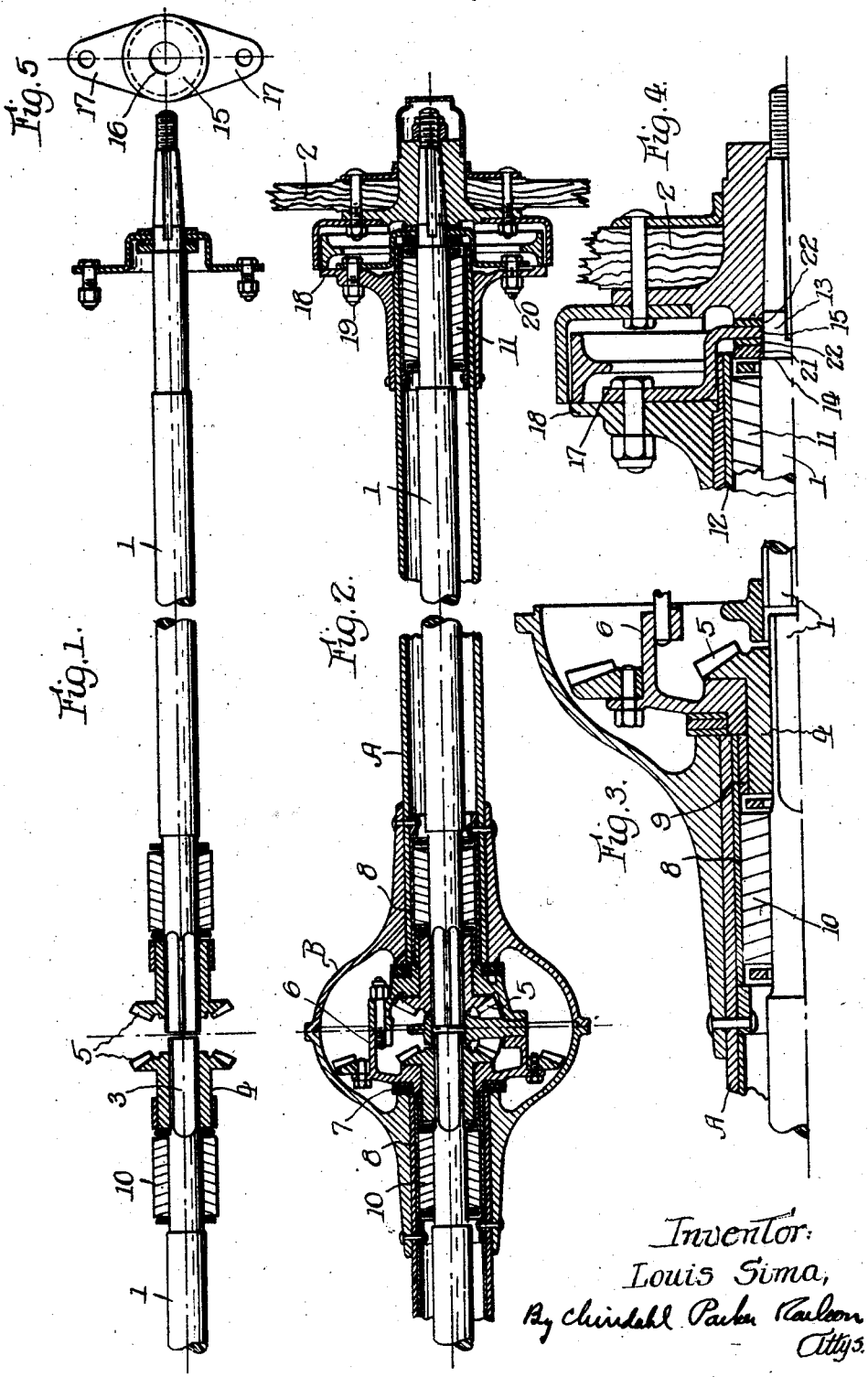
Inventor:
Louis Sima, Patented June 2, 1925.

1,540,146

UNITED STATES PATENT OFFICE.

LOUIS SIMA, OF CHICAGO, ILLINOIS.

REAR AXLE.

Application filed February 11, 1924. Serial No. 691,933.

*To all whom it may concern:*

Be it known that I, LOUIS SIMA, a citizen of the United States, residing at Chicago, in the county of Cook and State of Illinois, have invented a certain new and useful Rear Axle, of which the following is a specification.

The rear axle of Ford and Chevrolet cars is so constructed that in case of breakage of the shaft it is necessary to disassemble the rear axle structure in order to remove the broken parts and substitute a new shaft.

The object of the present invention is to modify the construction of the rear axle of a Ford or Chevrolet car in such a way that, in the event of breakage of the shaft, repairs may be quickly and easily effected.

In the accompanying drawings, Figure 1 is a fragmental view of a rear axle embodying the features of my invention, the enclosing casing and differential housing being omitted. Fig. 2 is a fragmental longitudinal sectional view of the rear axle. Fig. 3 is a fragmental view on an enlarged scale, showing the bearing for the inner end of the shaft section and the gear elements mounted thereon. Fig. 4 is a longitudinal sectional view of the means for supporting the outer end of the shaft section. Fig. 5 is a detail view of a flange associated with the outer end of the shaft section.

In the drawings, A denotes the rear axle housing and B the differential housing. 1 denotes the two alined shaft sections through which power is communicated to the rear wheels 2. In the standard Ford rear axle the inner end of the shaft section 1 is rigidly secured to one of the bevel gears of the differential. I employ a sliding fit between the shaft 1 and said differential gear, the end of the shaft being squared or splined, as at 3, and the hub 4 of the differential gear 5 being made relatively long so that the gear shall be efficiently supported upon the inner end of the shaft section. The differential gear case 6 is rotatably mounted upon the hubs 4 of the gears 5 in the ordinary way. Washers 7 are interposed between the differential gear case 6 and the inner ends of the sleeves 8 of the housing B. By reason of the elongation of the hub 4 of the differential gear 5, said hub extends within the inner end of the sleeve 8, a floating bushing 9 being interposed between the outer end of the hub 4 and said sleeve 8.

The roller bearing 10 is shorter than that used in the standard Ford rear axle, being shortened to acommodate the extended hub 4.

The outer end of the shaft section 1 is rotatably supported by means of a roller bearing 11 mounted within a bushing 12 fixed in the outer end of the rear axle housing. The wheel 2 is mounted upon and secured to the shaft section 1 in the usual manner.

Inasmuch as the shaft section 1 fits slidably within the hub 4 of the differential gear 5, means is provided near the outer end of the shaft section to prevent endwise movement of the shaft section. Between the wheel 2 and the roller bearing 11 the shaft section 1 is turned down to provide a cylindrical surface 13, at the inner end of which is an annular shoulder 14. A disk 15 having a central opening 16 fits slidably upon the cylindrical shaft portion 13 and is secured against movement longitudinally of the rear axle by suitable means, as, for example, one or more flanges 17 screwed or bolted to the flange 18 of the brake housing. In the construction shown in the drawings I avail myself of the bolt 19 by means of which the torsion rod is secured to said brake housing, said bolt serving to secure the flange 17 of the disk 15 rigidly to the brake housing. I have herein shown the disk 15 as provided with two flanges 17, one of which is secured to the brake housing 18 diametrically opposite to the bolt 19 by means of a bolt 20 passing through a hole drilled specially through the brake housing. 21 is a collar rigidly fixed upon the shaft section 1, as by pressing it onto the cylindrical surface 13 and up against the shoulder 14. It will be seen that the disk 15 lies between the collar 21 and the hub of the wheel 2 and thus serves to hold the shaft section 1 against excessive longitudinal movement. At opposite sides of the disk 15 are end thrust washers 22 or the like.

In the event of breakage of one of the shaft sections 1—1 the wheel 2 is removed, the bolts 19 and 20 are withdrawn, the disk 15 is removed, and the shaft section 1, with its roller bearing 11, is withdrawn. The broken piece lying within the hub of the differential gear 5 is pulled out, and a new shaft section carrying a roller bearing 11 and a collar 21 is inserted into the rear axle housing, the inner end of the shaft section being slid into the hub 4. The disk 15 and washers 22 are replaced and said disk secured in position, and the wheel 2 mounted upon the shaft.

It will be apparent that the construction herein shown greatly simplifies and shortens the operation of repairing a Ford or Chevrolet rear axle, and that the modifications or departures from the standard Ford and Chevrolet construction involve relatively little expense.

I claim as my invention:

1. A rear axle for automobiles having, in combination, a rear axle housing, a shaft section in said housing, an anti-friction bearing in said housing for the outer end portion of said shaft section, the outer end portion of said shaft section being reduced in diameter to provide a cylindrical surface and an annular shoulder, a stop collar rigidly mounted on said cylindrical surface against said shoulder, a wheel mounted on the outer end of said shaft section, a disk through which the shaft section extends, said disk lying between said stop collar and said wheel, a flange on said disk, a part rigid with the rear axle housing, and a bolt securing said flange to said part.

2. A rear axle for automobiles having, in combination, a rear axle housing, a shaft section in said housing, an anti-friction bearing, in said housing for the outer end portion of said shaft section, a stop collar rigidly mounted on said shaft section, a wheel mounted on the outer end of said shaft section, a disk through which the shaft section extends, said disk lying between said stop collar and said wheel, a flange on said disc, and means acting on said flange, to secure said disk against movement longitudinally of the rear axle housing.

In testimony whereof, I have hereunto affixed my signautre.

LOUIS SIMA.